US011365010B2

(12) United States Patent
Mansouri et al.

(10) Patent No.: US 11,365,010 B2
(45) Date of Patent: Jun. 21, 2022

(54) BENT TUBE SEAT STRUCTURE

(71) Applicants: Safran Seats USA LLC, Gainesville, TX (US); Safran, Paris (FR)

(72) Inventors: Reza Mansouri, Costa Mesa, CA (US); Romain Tranier, Costa Mesa, CA (US); Charles Michael Parker, Irvine, CA (US); Arthur Glain, Boulogne-Billancourt (FR)

(73) Assignees: Safran Seats USA LLC, Gainesville, TX (US); Safran, Paris (FR)

( * ) Notice: Subject to any disclaimer, the term of this patent is extended or adjusted under 35 U.S.C. 154(b) by 0 days.

(21) Appl. No.: 17/290,270

(22) PCT Filed: Nov. 30, 2018

(86) PCT No.: PCT/US2018/063310
§ 371 (c)(1),
(2) Date: Apr. 30, 2021

(87) PCT Pub. No.: WO2020/091820
PCT Pub. Date: May 7, 2020

(65) Prior Publication Data
US 2022/0017225 A1    Jan. 20, 2022

Related U.S. Application Data

(60) Provisional application No. 62/753,406, filed on Oct. 31, 2018.

(51) Int. Cl.
*B64D 11/06* (2006.01)

(52) U.S. Cl.
CPC ...... *B64D 11/0648* (2014.12); *B64D 11/0601* (2014.12); *B64D 11/0696* (2013.01)

(58) Field of Classification Search
CPC ............ B64D 11/0648; B64D 11/0696; B64D 11/0601
See application file for complete search history.

(56) References Cited

U.S. PATENT DOCUMENTS 2,674,300 A  *  4/1954 Liljengren ......... B64D 11/0696
                                                             297/43
6,086,018 A       7/2000 Gobeil et al.
(Continued)

FOREIGN PATENT DOCUMENTS

CA         2704897 A1 * 3/2011  ......... B64D 11/0696
DE     102010046126 A1    3/2012
(Continued)

OTHER PUBLICATIONS

International Patent Application No. PCT/US2018/063310, International Search Report and Written Opinion, dated Jul. 3, 2019.

*Primary Examiner* — Timothy J Brindley
(74) *Attorney, Agent, or Firm* — Kilpatrick Townsend & Stockton LLP

(57) ABSTRACT

A passenger seat includes a seat frame, a plurality of legs extending down from the seat frame where each of the plurality of legs includes an upper end attached to the seat frame and a lower end, and at least one tube attached to the lower end of at least one of the plurality of legs. The at least one tube includes at least two attachments to a floor structure. The at least one tube includes at least one bent portion.

19 Claims, 5 Drawing Sheets

(56) References Cited

U.S. PATENT DOCUMENTS

| | | | |
|---|---|---|---|
| 2004/0212243 A1* | 10/2004 | Johnson | B64D 11/0648 |
| | | | 297/452.18 |
| 2014/0283296 A1 | 9/2014 | Jerome et al. | |
| 2018/0215469 A1 | 8/2018 | Uriu et al. | |
| 2021/0137272 A1* | 5/2021 | Brooks | A47C 7/002 |
| 2021/0387732 A1* | 12/2021 | Salzer | B64D 11/0638 |

FOREIGN PATENT DOCUMENTS

| | | | | |
|---|---|---|---|---|
| DE | 202021104017 U1 * | 11/2021 | | |
| WO | WO-2010117920 A1 * | 10/2010 | | B60N 2/68 |
| WO | 2013144935 A2 | 10/2013 | | |
| WO | WO-2018017043 A1 * | 1/2018 | | B60N 2/682 |
| WO | WO-2020091820 A1 * | 5/2020 | | B64D 11/0601 |
| WO | WO-2021247011 A1 * | 12/2021 | | |
| WO | WO-2022013039 A1 * | 1/2022 | | |

\* cited by examiner

BENT TUBE SEAT STRUCTURE

CROSS REFERENCE TO RELATED APPLICATION

This application is related to and claims the benefit of U.S. Provisional Application No. 62/753,406 ("the '406 application"), filed on Oct. 31, 2018, entitled BENT TUBE SEAT STRUCTURE. The '406 application is hereby incorporated in its entirety by this reference.

FIELD OF THE INVENTION

The field of the invention relates to structural assemblies that including at least one bent tube for passenger seats in aircraft or the like.

BACKGROUND

Passenger seats, and particularly vehicle or aircraft passenger seats, are designed based on numerous factors including, for example, enhancing comfort, aesthetics, and convenience. In addition, passenger seats and arrays thereof are designed to maximize the number of seats within the cabin of the vehicle while conforming to the constraints defined by the structural layout for attaching the passenger seats. Due to such efficiencies, conventional seats may be designed with minimal space available for each individual passenger.

In certain situations, it may be desirable to design structural attachment assemblies for passenger seats and arrays thereof to interface with aircraft floor structure and to maximize the available living space for passengers while simultaneously minimizing weight and minimizing costs associated with manufacturing the seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a seat frame; a plurality of legs extending down from the seat frame, wherein each of the plurality of legs comprises an upper end attached to the seat frame and a lower end; and at least one tube attached to the lower end of at least one of the plurality of legs, wherein: the at least one tube comprises at least two attachments to a floor structure; and the at least one tube comprises at least one bent portion.

The at least one tube, in certain embodiments, comprises two tubes.

In certain embodiments, the at least one bent portion comprises at least one continuous curve portion.

In some embodiments, the at least one continuous curve portion comprises an oblique angle.

In some embodiments, the at least one bent portion comprises a plurality of bent portions such that the plurality of bent portions span an entire length of the at least one tube and the at least one tube comprises an inflection point between adjacent bent portions.

The at least one tube, in certain embodiments, comprises an additional tube, wherein the additional tube is a straight tube.

The at least one tube, in some embodiments, comprises an additional tube, wherein the additional tube comprises at least one bent portion.

In some embodiments, the at least one tube comprises at least three attachments to the floor structure.

In certain embodiments, the at least one tube comprises an attachment to an additional tube.

In some embodiments, the passenger seat is one seat within an array of passenger seats in a vehicle; and a configuration of the at least one bent portion defines an orientation of the passenger seat such that the passenger seat is non-parallel with at least one other passenger seat in the array of passenger seats.

According to certain embodiments of the present invention, a plurality of passenger seats attached to a floor structure comprises: a plurality of different orientations for the plurality of passenger seats relative to a common axis such that the plurality of passenger seats comprises passenger seats oriented in at least three different directions, wherein: each passenger seat comprises a seat frame and a plurality of legs extending from the seat frame toward the floor structure; the plurality of legs for each passenger seat is interchangeable such that the plurality of legs are compatible with seats oriented in each of the at least three different directions; each passenger seat comprises at least one tube attached to a lower end of at least one of the plurality of legs; and the at least one tube comprises at least one bent portion.

In certain embodiments, a configuration of the at least one bent portion orients each passenger seat in one of the at least three different directions.

In some embodiments, the at least one tube comprises two tubes.

The at least one bent portion, in certain embodiments, comprises at least one continuous curve portion.

In certain embodiments, the at least one continuous curve portion comprises an oblique angle.

In some embodiments, the at least one bent portion comprises a plurality of bent portions such that the plurality of bent portions span an entire length of the at least one tube and the at least one tube comprises an inflection point between adjacent bent portions.

The at least one tube, in some embodiments, comprises an additional tube, wherein the additional tube is a straight tube.

In certain embodiments, the at least one tube comprises an additional tube, wherein the additional tube comprises at least one bent portion.

In some embodiments, the at least one tube comprises at least three attachments to the floor structure.

The at least one tube, in certain embodiments, comprises an attachment to an additional tube.

DETAILED DESCRIPTION

Figure 1:
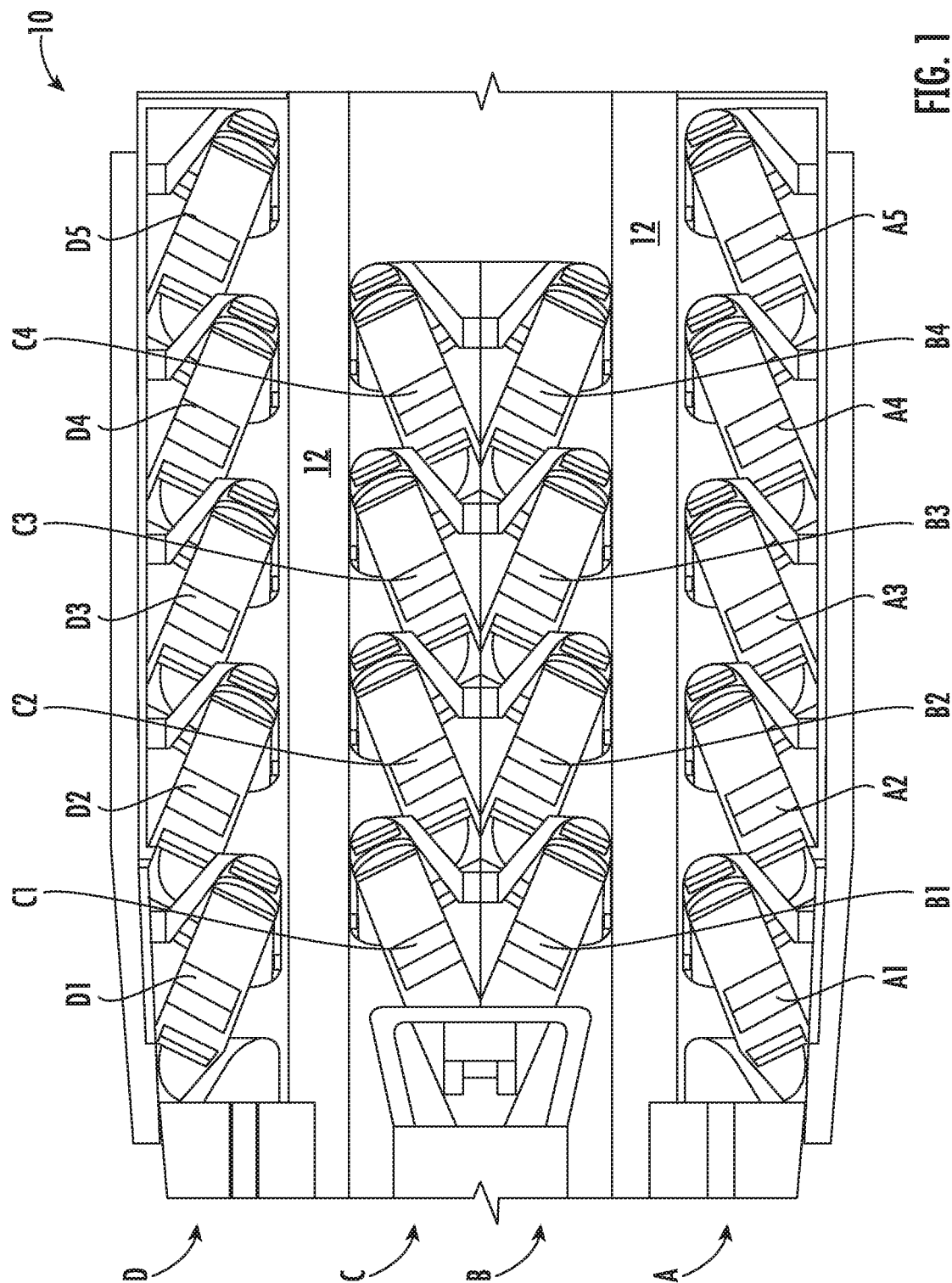
FIG. 1 is a top view an array of passenger seats according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-4B illustrate embodiments of arrays 10 of passenger seats in vehicles such as an aircraft where each passenger seat may include a structural attachment assembly 100 for attaching to the structure of the vehicle. In some examples, the structural attachment assemblies 100 attach to a floor structure of the vehicle, which may include multiple attachment rails (e.g., rails 21, 22). The structural attachment assembly 100 may include an aft tube 101, a forward tube 201, two or more attachment fittings (e.g., floor attachments 111, 211, 212), and any other appropriate component. The structural attachment assembly 100 may include any number of tubes.

Figure 5:
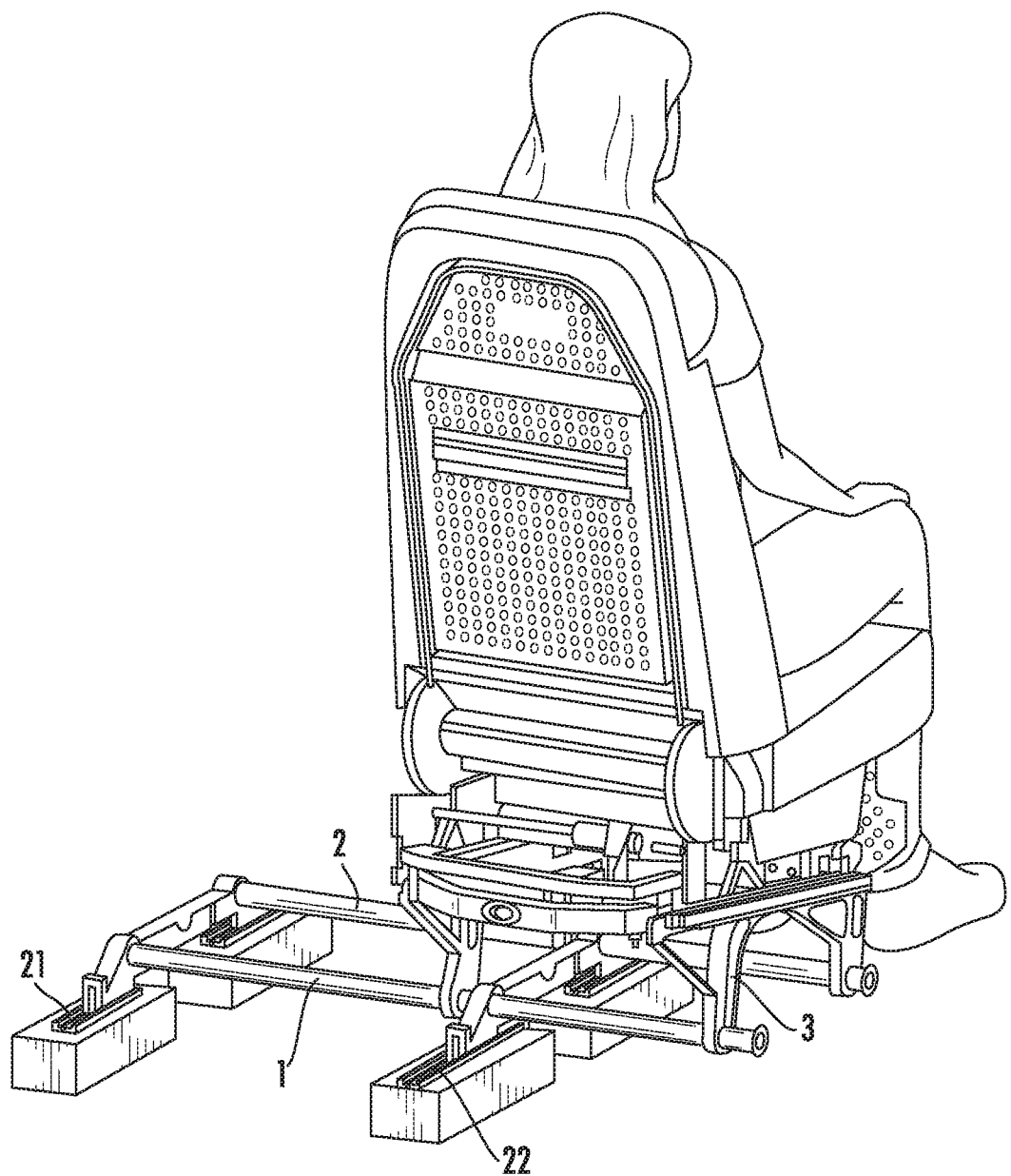
FIG. 5 is a perspective view of a conventional structural attachment assembly.

FIG. 1 shows an example of an array of passenger seats that includes four columns of seats (columns A, B, C, and D) with two aisles 12. The outboard columns A and D each include five seats (A1-A5 and D1-D5). The inboard columns B and C each include four seats (B1-B4 and C1-C4). In some embodiments, the array of seats may include six different configurations based on the orientation of the various seats. For example, each column may have a different angle relative to the common axis X and the forwardmost seat in each of the outboard columns may have a different orientation compared to the other seats in the respective column. In other words, seat A1 may have a different angle relative to axis X compared to at least one of seats A2-A5. Similarly, seat D1 may have a different angle relative to axis X compared to at least one of seats D2-D5. To accommodate such a configuration, conventional seats include intricate custom parts for each configuration. For example, as shown in FIG. 5, a conventional seat would include one or more frame leg members 3 that are specific to each configuration and/or a custom machined plate for attaching the seat to the floor structure. The conventional seat shown in FIG. 5 includes lateral members 1, 2 that are common to multiple configurations of passenger seats. In other words, conventional seats designed for the array of seats shown in FIG. 1 would require six different configurations of frame leg members 3 (where each configuration would necessitate 2-4 custom machined frame leg members 3).

To address these issues and to allow a common frame leg member for all orientations of passenger seats, each passenger seat comprises a structural attachment assembly 100 with at least one tube attached to a lower end of at least one of the plurality of legs where the at least one tube is designed to adapt the seat (in a desired orientation and/or position) to attach to the floor structure of the vehicle. The array of passenger seats shown in FIG. 1 includes various orientations relative to the common axis X and differing lateral locations for the seats (i.e., based on width of the cabin and distance from the exterior dimensions of available space within the cabin). In other embodiments, the structural attachment assemblies 100 may accommodate staggered arrangements of the seats (e.g., see FIG. 2). In addition to simplifying assembly and manufacturing for seat arrays by allowing further modularity (common frame legs for multiple seat configurations), the structural attachment assembly 100 may also increase available living space for passengers and reduce weight. The structural attachment assemblies 100 may be appropriate for arrays of business or first class seats. In some embodiments, the structural attachment assemblies 100 may be appropriate for arrays of economy or coach passenger seats.

FIGS. 2-4B show examples of various configurations of seat tubes for structural attachment assemblies 100 of passenger seats in various orientations including, for example, the orientations required for the array of seats shown in FIG. 1. In the example shown in FIG. 2, a passenger seat 11 includes a structural attachment assembly 100 to arrange a sitting position of the seat 11 proximal to aisle 12 where the structural attachment assembly 100 includes an aft tube 101 and a forward tube 201. The aft tube 101 includes a first bent portion 102, a second bent portion 103, a first floor attachment 111, and a second floor attachment 112. The forward tube 201 includes a first floor attachment 211 and a second floor attachment 212. The seat on the forward side of passenger seat 11 includes a structural attachment assembly 100a that differs from structural attachment assembly 100. Structural attachment assembly 100a arranges a sitting position of a seat (not shown) distal from aisle 12 and includes an aft tube 101a and a forward tube 201a. The aft tube 101a includes a first bent portion 102a, a second bent portion 103a, a first floor attachment 111a, and a second floor attachment 112a. The forward tube 201a includes a first floor attachment 211a and a second floor attachment 212a.

Figure 2:
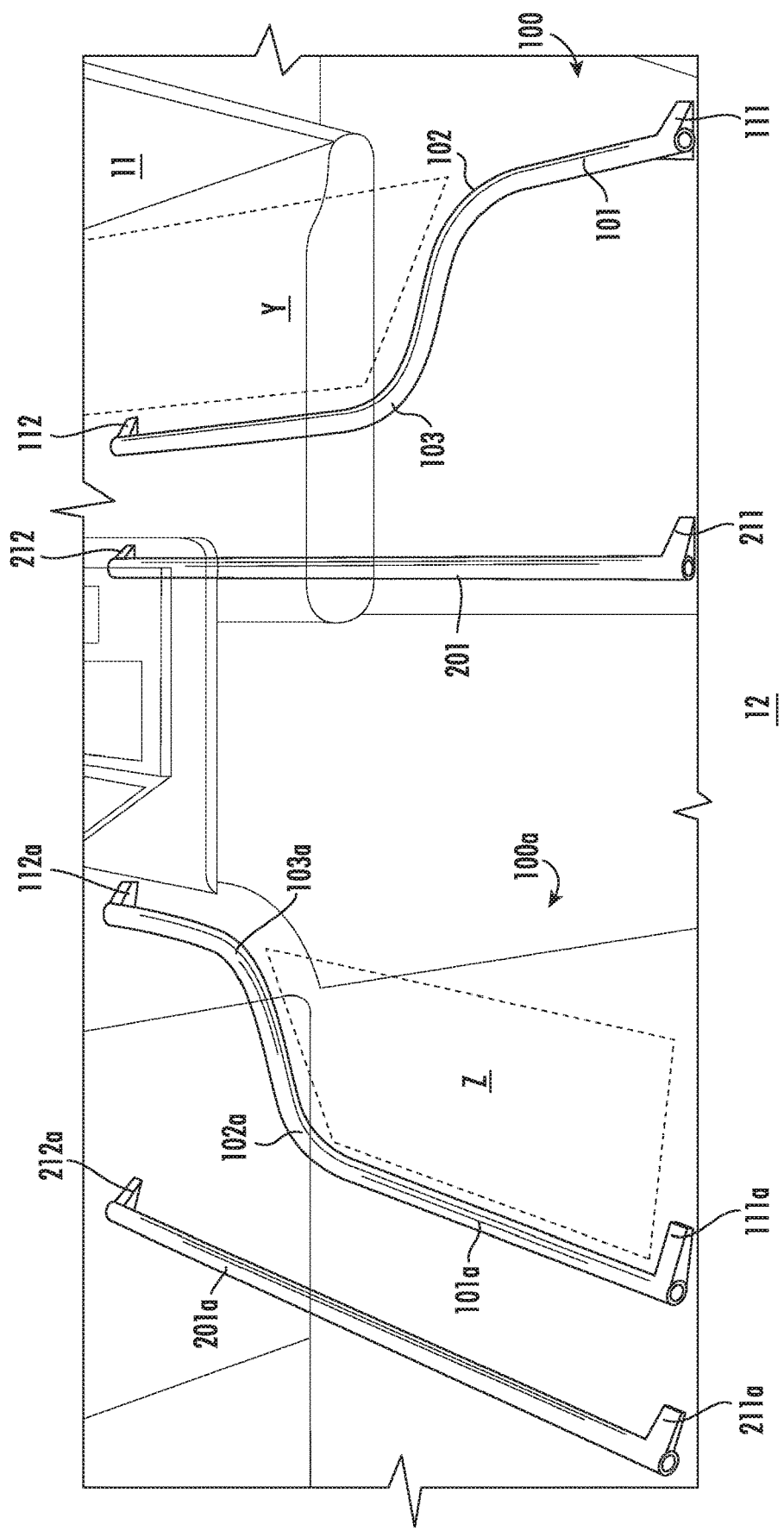
FIG. 2 is a perspective view of structural attachment assemblies of FIG. 1.

In the staggered arrangement of the seats shown in FIG. 2, the configuration of structural attachment assembly 100a creates additional living space for the passenger in seat 11. In particular, the aft tube 101a and the first and second bent portions 102a, 103a allow for more legroom for a passenger seated in passenger seat 11. A conventional seat would include a straight lateral member extending from second floor attachment 112a toward aisle 12 (e.g., see lateral members 1, 2 in FIG. 5). The increased living space for the passenger in seat 11 is shown in FIG. 2 as area Z. Moreover, to modify a conventional seat (e.g., the conventional seat shown in FIG. 5) to try to replicate the arrangement shown in FIG. 2 would require specifically designed machined leg members 3 and/or a complex machined plate. The configuration of structural attachment assembly 100, 100a (including the aft tubes 101, 101a and the forward tubes 201, 201a) are significantly lighter than designed based on machined leg members 3 and/or a complex machined plate. Similarly, the structural attachment assembly 100 creates additional living space for a passenger seated behind passenger seat 11. A conventional seat would include a straight lateral member extending from first floor attachment 111 away from aisle 12 (e.g., see lateral members 1, 2 in FIG. 5). The increased living space for the passenger seated behind passenger seat 11 is shown in FIG. 2 as area Y.

Figure 3:
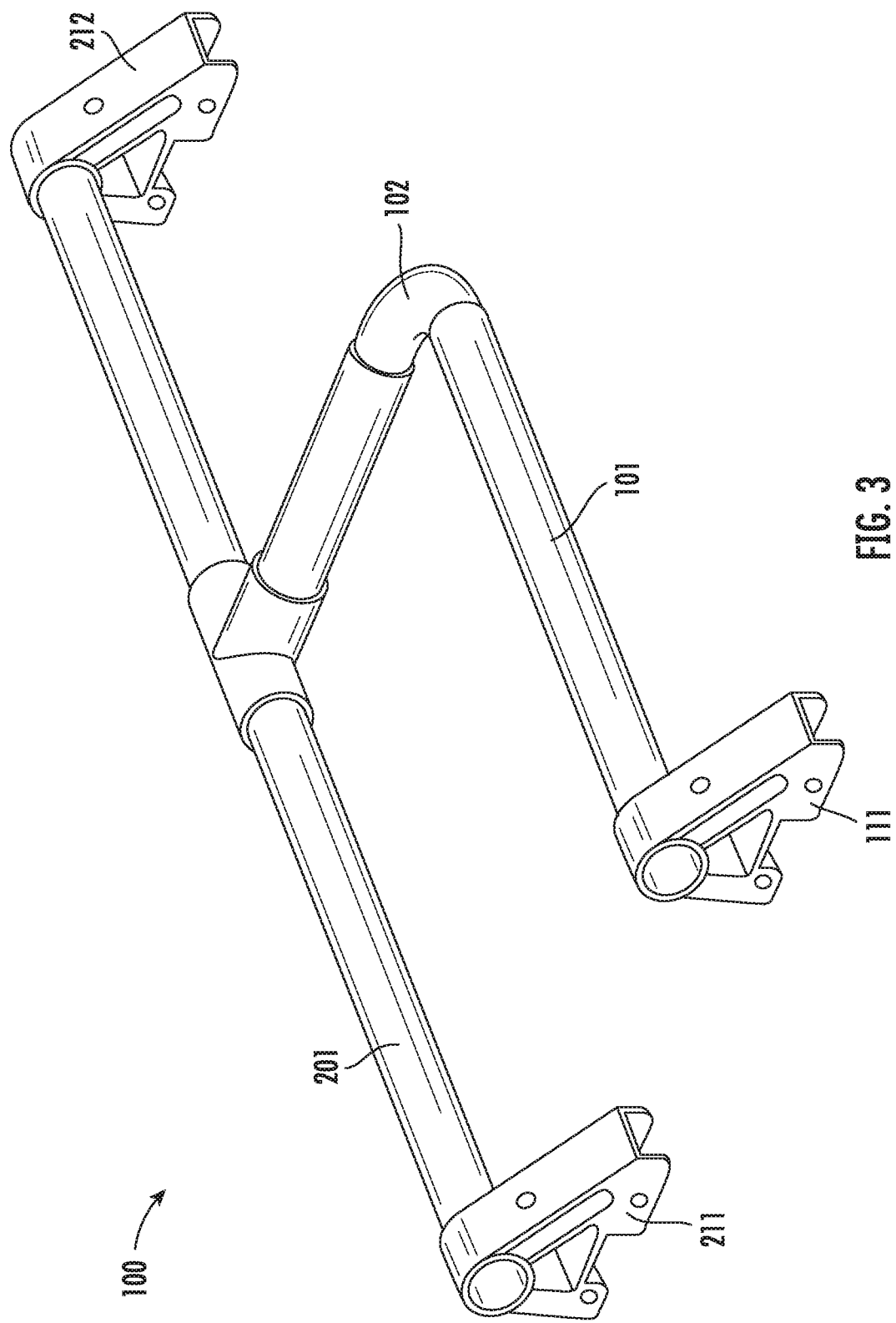
FIG. 3 is a perspective view of a structural attachment assembly of FIG. 1.

The bent portions 102, 103, 102a, 103a shown in FIG. 2 are illustrative examples. However, the aft tubes 101, 101a and/or the forward tubes 201, 201a may each include various types and quantities of bent portions. Although FIGS. 2 and 3 show examples where the forward tube 201 does not include any bent portions, the forward tube 201 may include any number of bent portions. In some embodiments, the bent portions are continuous curved portions of the respective tubes that form oblique angles relative to the remaining portions of the respective tube. As shown in FIGS. 2 and 3, a tube may include a straight (non-curved) segment adjacent to a bent portion. For example, aft tube 101 includes a straight segment between the first floor attachment 111 and the first bent portion 102, a straight segment between the first bent portion 102 and the second bent portion 103, and a straight segment between the second bent portion 103 and the second floor attachment 112. As one non-limiting example of an oblique angle, the bent portions each form an angle of approximately 135° with the respective tube (see FIG. 2). In some cases, the angle formed by the bent portion may be approximately 90° such that tube includes a portion that is perpendicular relative to the respective tube (see FIG. 3). As shown in FIG. 3, in some embodiments, the aft tube 101 may include at least one bent portion (bent portion 102) and may intersect and/or attach to forward tube 201, which eliminates the need for the second floor attachment 112.

In some embodiments, the material for the various aft and forward tubes may include at least one of aluminum, magnesium, titanium, steel, plastic, composite, or any other appropriate material. These tubes may have any appropriate cross-section including, for example, circular, box, I-beam, C-beam, oval, etc. The tubes may be manufactured by extrusion, drawing, molding, or any other appropriate method. The tubes (in a straight or bent configuration) may have a total length of approximately 50 cm (20 inches) to approximately 356 cm (140 inches). In some cases, the bend radius for the bent portion may be approximately 2.5 cm (1 inch) to approximately 127 cm (50 inches).

Figure 4A:
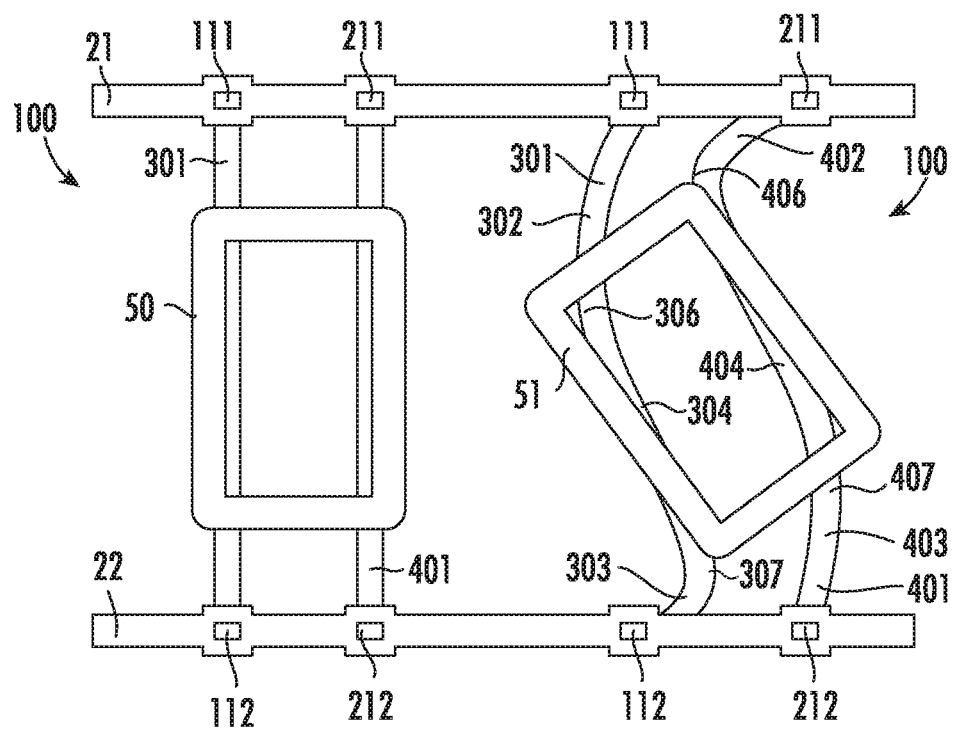
FIGS. 4A and 4B are top views of structural attachment assemblies of FIG. 1A.
Figure 4B:
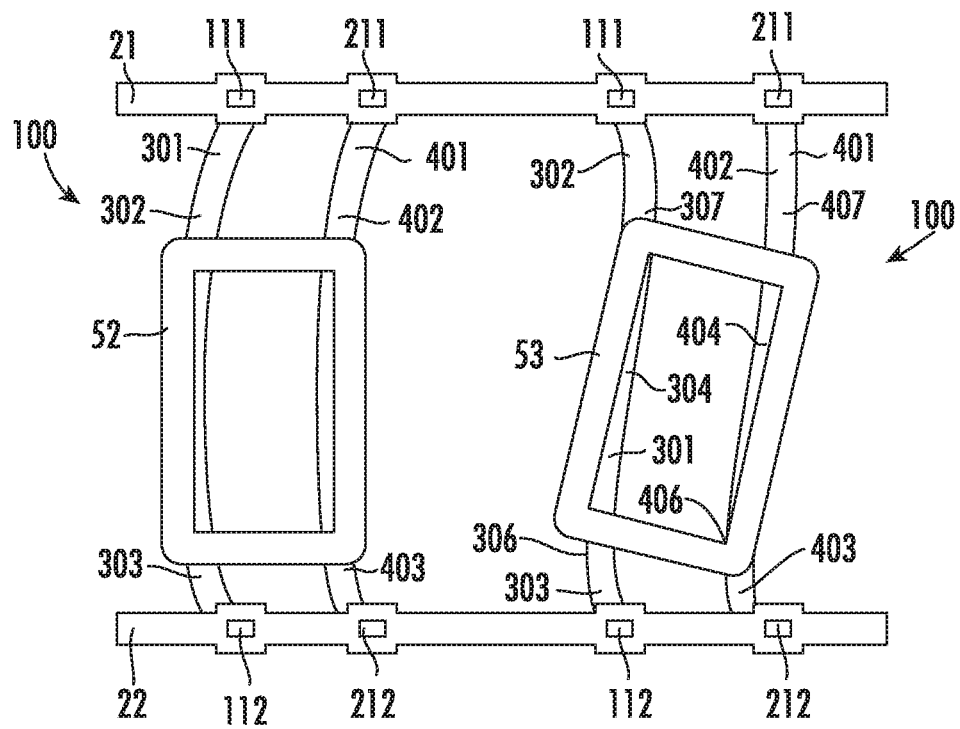

FIGS. 4A and 4B show other exemplary configurations for structural attachment assembly 100. Rails 21 and 22 (part of the floor structure of the vehicle) locate the floor attachments 111, 112, 211, 212. FIG. 4A illustrates an example where a seat frame 50 is attached to a conventional straight aft tube 301 and a conventional straight forward tube 401. Although not illustrated in FIGS. 4A and 4B, each seat frame 50-53 includes multiple leg members (similar to leg members 3 shown in FIG. 5) to attach the respective frame to one or more seat tubes (e.g., aft tube 301 and forward tube 401). The varying configurations of the seat tubes allow a single common configuration for the seat frame and the multiple leg members. In other words, all four of the configurations shown in FIGS. 4A and 4B share a common design for the seat frame and the multiple leg members. The variation in the seat tubes (e.g., aft tube 301 and forward tube 401) allows the structural attachment assembly 100 to accommodate and to be adapted for various positions and orientations without modifying the seat frame or the leg members.

The seat frame 51, as shown in FIG. 4A, is attached to an aft tube 301 with multiple bent portions and a forward tube 401 with multiple bent portions. The aft tube 301, unlike the examples illustrated in FIGS. 2 and 3, does not include discernable straight segments. The aft tube 301 includes a first bent portion 302 and a second bent portion 303. In some embodiments, the first bent portion 302 and the second bent portion 303 span the entire width between the first floor attachment 111 and the second floor attachment 112 and meet one another at an inflection point 304. Although the tubes 301, 401 are each illustrated with two curved portions with one inflection point between the curved portions, the tubes may have any number of curved portions and inflection points including, for example, three curved portions and two inflection points. As shown in FIG. 4A, the curvature of the first bent portion 302 is more gradual than the curvature of the second bent portion 303. The first bent portion 302 extends aft from a line connecting the first floor attachment 111 and the second floor attachment 112 while the second bent portion 303 extends forward from the line connecting the first floor attachment 111 and the second floor attachment 112. In some cases, the forwardmost point 307 of the second bent portion 303 extends a greater distance from the line connecting the first floor attachment 111 and the second floor attachment 112 compared to the aftmost point 306 of the first bent portion 302 (comparing absolute distance regardless of direction). The forward tube 401 for seat frame 51 also does not include discernable straight segments. The forward tube 401 includes a first bent portion 402 and a second bent portion 403. In some embodiments, the first bent portion 402 and the second bent portion 403 span the entire width between the first floor attachment 211 and the second floor attachment 212 and meet one another at an inflection point 404. As shown in FIG. 4A, the curvature of the second bent portion 403 is more gradual than the curvature of the first bent portion 402. The first bent portion 402 extends aft from a line connecting the first floor attachment 211 and the second floor attachment 212 while the second bent portion 403 extends forward from the line connecting the first floor attachment 211 and the second floor attachment 212. In some cases, the aftmost point 406 of the first bent portion 402 extends a greater distance from the line connecting the first floor attachment 211 and the second floor attachment 212 compared to the forwardmost point 407 of the second bent portion 403 (comparing absolute distance regardless of direction).

In some embodiments, the seat frame 51 is located approximately halfway between the rails 21 and 22, but is rotated relative to seats that face forward (e.g., seat frame 50). The seat frame 51 may be rotated between approximately 35° and approximately 40° relative to the forward/aft direction. In other cases, the seat frame may be rotated to any appropriate orientation.

The seat frame 52, as shown in FIG. 4B, is attached to an aft tube 301 with multiple bent portions and a forward tube 401 with multiple bent portions. The aft tube 301 may include a straight segment between the first bent portion 302 and the second bent portion 303. The curvature of the first bent portion 302 may be more gradual than the curvature of the second bent portion 303. Similarly, the forward tube 401 may include a straight segment between the first bent portion 402 and the second bent portion 403. The curvature of the first bent portion 402 may be more gradual than the curvature of the second bent portion 403. In some embodiments, the aft tube 301 and the forward tube 401 are configured such that the seat frame 52 is offset in at least one direction relative to a conventional position (e.g., seat frame 50 in FIG. 4A is one example of a conventional position). As shown in FIG. 4B, the seat frame 52 may be oriented in a typical direction (similar/parallel to seat frame 50) while in other cases, a seat frame may be both offset in at least one direction and rotated. The seat frame 52 may be offset in a lateral direction such that the seat frame 52 is closer to right side rail 22 compared to left side rail 21. In some cases, a seat frame may be offset in the opposite direction such that the seat is closer to left side rail 21 compared to right side rail 22. In some embodiments, the seat frame 52 is offset in the aft direction such that the center of the seat frame is closer to the line connecting the first floor attachment 111 and the second floor attachment 112 compared to the line connecting the first floor attachment 211 and the second floor attachment 212. The seat frame may also be offset in the opposite direction such that the center of the seat frame is closer to the line connecting the first floor attachment 211 and the second floor attachment 212 compared to the line connecting the first floor attachment 111 and the second floor attachment 112.

The seat frame 53, as shown in FIG. 4B, is attached to an aft tube 301 with multiple bent portions and a forward tube 401 with multiple bent portions. For the aft tube 301, the curvature of the first bent portion 302 may be more gradual than the curvature of the second bent portion 303. Similarly, for the forward tube 401, the curvature of the first bent portion 402 may be more gradual than the curvature of the second bent portion 403. In some embodiments, the tubes for seat frame 53 combine features from the tubes for seat frames 51 and 52. For the aft tube 301, the first bent portion 302 and the second bent portion 303 may span the entire width between the first floor attachment 111 and the second floor attachment 112 and meet one another at an inflection point 304. Similarly, for the forward tube 401, the first bent portion 402 and the second bent portion 403 may span the entire width between the first floor attachment 211 and the second floor attachment 212 and meet one another at an inflection point 404. As shown in FIG. 4B, the first bent portion 302 may include a forwardmost point 307 and the second bent portion 303 may include an aftmost point 306. For the forward tube 401, the first bent portion 402 may include a forwardmost point 407 and the second bent portion 403 may include an aftmost point 406. Based on the configuration of the aft tube 301 and the forward tube 401, the seat frame 53 may be rotated between approximately 10° and approximately 20° relative to the forward/aft direction. In other cases, the seat frame may be rotated to any appropriate orientation.

In addition to the rotated orientation, in some embodiments, the aft tube 301 and the forward tube 401 are configured such that the seat frame 53 is offset in at least one direction relative to a conventional position (e.g., seat frame 50 in FIG. 4A is one example of a conventional position). The seat frame 53 may be offset in a lateral direction such that the seat frame 53 is closer to right side rail 22 compared to left side rail 21. In some cases, a seat frame may be offset in the opposite direction such that the seat is closer to left side rail 21 compared to right side rail 22. In some embodiments, the seat frame 53 is offset in the aft direction such that the center of the seat frame is closer to the line connecting the first floor attachment 111 and the second floor attachment 112 compared to the line connecting the first floor attachment 211 and the second floor attachment 212. The seat frame may also be offset in the opposite direction such that the center of the seat frame is closer to the line connecting the first floor attachment 211 and the second floor attachment 212 compared to the line connecting the first floor attachment 111 and the second floor attachment 112.

The components of the structural attachment assembly 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the structural attachment assembly 100 may be attached to one another via suitable fasteners, which include, but are not limited to, screws, bolts, rivets, or other mechanical or chemical fasteners.

In the following, further examples are described to facilitate understanding of aspects of the invention:

Example A. A passenger seat comprising:
a seat frame;
a plurality of legs extending down from the seat frame, wherein each of the plurality of legs comprises an upper end attached to the seat frame and a lower end; and
at least one tube attached to the lower end of at least one of the plurality of legs, wherein:
the at least one tube comprises at least two attachments to a floor structure; and
the at least one tube comprises at least one bent portion.

Example B. The passenger seat of Example A or any of the preceding or subsequent examples, wherein the at least one tube comprises two tubes.

Example C. The passenger seat of Example A or any of the preceding or subsequent examples, wherein the at least one bent portion comprises at least one continuous curve portion.

Example D. The passenger seat of Example C or any of the preceding or subsequent examples, wherein the at least one continuous curve portion comprises an oblique angle.

Example E. The passenger seat of Example A or any of the preceding or subsequent examples, wherein the at least one bent portion comprises a plurality of bent portions such that the plurality of bent portions span an entire length of the at least one tube and the at least one tube comprises an inflection point between adjacent bent portions.

Example F. The passenger seat of Example A or any of the preceding or subsequent examples, wherein the at least one tube comprises an additional tube, wherein the additional tube is a straight tube.

Example G. The passenger seat of Example A or any of the preceding or subsequent examples, wherein the at least one tube comprises an additional tube, wherein the additional tube comprises at least one bent portion.

Example H. The passenger seat of Example A or any of the preceding or subsequent examples, wherein the at least one tube comprises at least three attachments to the floor structure.

Example I. The passenger seat of Example A or any of the preceding or subsequent examples, wherein the at least one tube comprises an attachment to an additional tube.

Example J. The passenger seat of Example A or any of the preceding or subsequent examples, wherein:
the passenger seat is one seat within an array of passenger seats in a vehicle; and
a configuration of the at least one bent portion defines an orientation of the passenger seat such that the passenger seat is non-parallel with at least one other passenger seat in the array of passenger seats.

Example K. A plurality of passenger seats attached to a floor structure comprising:
a plurality of different orientations for the plurality of passenger seats relative to a common axis such that the plurality of passenger seats comprises passenger seats oriented in at least three different directions, wherein:
each passenger seat comprises a seat frame and a plurality of legs extending from the seat frame toward the floor structure;
the plurality of legs for each passenger seat is interchangeable such that the plurality of legs are compatible with seats oriented in each of the at least three different directions;
each passenger seat comprises at least one tube attached to a lower end of at least one of the plurality of legs; and
the at least one tube comprises at least one bent portion.

Example L. The plurality of passenger seats of Example K or any of the preceding or subsequent examples, wherein a configuration of the at least one bent portion orients each passenger seat in one of the at least three different directions.

Example M. The plurality of passenger seats of Example K or any of the preceding or subsequent examples, wherein the at least one tube comprises two tubes.

Example N. The plurality of passenger seats of Example K or any of the preceding or subsequent examples, wherein the at least one bent portion comprises at least one continuous curve portion.

Example O. The plurality of passenger seats of claim N, wherein the at least one continuous curve portion comprises an oblique angle.

Example P. The plurality of passenger seats of Example K or any of the preceding or subsequent examples, wherein the at least one bent portion comprises a plurality of bent portions such that the plurality of bent portions span an entire length of the at least one tube and the at least one tube comprises an inflection point between adjacent bent portions.

Example Q. The plurality of passenger seats of Example K or any of the preceding or subsequent examples, wherein the at least one tube comprises an additional tube, wherein the additional tube is a straight tube.

Example R. The plurality of passenger seats of Example K or any of the preceding or subsequent examples, wherein the at least one tube comprises an additional tube, wherein the additional tube comprises at least one bent portion.

Example S. The plurality of passenger seats of Example K or any of the preceding or subsequent examples, wherein the at least one tube comprises at least three attachments to the floor structure.

Example T. The plurality of passenger seats of Example K or any of the preceding or subsequent examples, wherein the at least one tube comprises an attachment to an additional tube.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An arrangement of passenger seats in a vehicle comprising:
    an array of passenger seats, each passenger seat comprising:
      a seat frame;
      a plurality of legs extending down from the seat frame, wherein each of the plurality of legs comprises an upper end attached to the seat frame and a lower end; and
    at least one tube attached to the lower end of at least one of the plurality of legs, wherein:
      the at least one tube comprises at least two attachments to a floor structure; and
      the at least one tube comprises at least one bent portion;
      wherein a configuration of the at least one bent portion defines an orientation of one of the passenger seats such that the one passenger seat is non-parallel with at least one other passenger seat in the array of passenger seats.

2. The arrangement of claim 1, wherein
    the array of passenger seats comprise a plurality of different orientations for the array of passenger seats relative to a common axis such that the array of passenger seats comprises passenger seats oriented in at least three different directions, wherein:
    the plurality of legs for each passenger seat is interchangeable such that the plurality of legs are compatible with seats oriented in each of the at least three different directions.

3. The arrangement of claim 1, wherein the at least one tube comprises two tubes.

4. The arrangement of claim 1, wherein the at least one bent portion comprises at least one continuous curve portion.

5. The arrangement of claim 4, wherein the at least one continuous curve portion comprises an oblique angle.

6. The arrangement of claim 1, wherein the at least one bent portion comprises a plurality of bent portions such that the plurality of bent portions span an entire length of the at least one tube and the at least one tube comprises an inflection point between adjacent bent portions.

7. The arrangement of claim 1, wherein the at least one tube comprises an additional tube, wherein the additional tube is a straight tube.

8. The arrangement of claim 1, wherein the at least one tube comprises an additional tube, wherein the additional tube comprises at least one bent portion.

9. The arrangement of claim 1, wherein the at least one tube comprises at least three attachments to the floor structure.

10. The arrangement of claim 1, wherein the at least one tube comprises an attachment to an additional tube.

11. The arrangement of claim 2, wherein a configuration of the at least one bent portion orients each passenger seat in one of the at least three different directions.

12. The arrangement of claim 2, wherein the at least one tube comprises two tubes.

13. The arrangement of claim 2, wherein the at least one bent portion comprises at least one continuous curve portion.

14. The arrangement of claim 13, wherein the at least one continuous curve portion comprises an oblique angle.

15. The arrangement of claim 2, wherein the at least one bent portion comprises a plurality of bent portions such that the plurality of bent portions span an entire length of the at least one tube and the at least one tube comprises an inflection point between adjacent bent portions.

16. The arrangement of claim 2, wherein the at least one tube comprises an additional tube, wherein the additional tube is a straight tube.

17. The arrangement of claim 2, wherein the at least one tube comprises an additional tube, wherein the additional tube comprises at least one bent portion.

18. The arrangement of claim 2, wherein the at least one tube comprises at least three attachments to the floor structure.

19. The arrangement of claim 2, wherein the at least one tube comprises an attachment to an additional tube.

* * * * *